US006272613B1

United States Patent
Bouraoui et al.

(10) Patent No.: US 6,272,613 B1
(45) Date of Patent: Aug. 7, 2001

(54) METHOD AND SYSTEM FOR ACCESSING STORAGE AREA OF A DIGITAL DATA PROCESSING MACHINE IN BOTH THE PHYSICAL AND VIRTUAL ADDRESSING MODES

(75) Inventors: Nadia Bouraoui; Jean-Pascal Mazzilli, both of Eybens; Jean-Dominique Sorace, Lancey, all of (FR)

(73) Assignee: Bull S.A., Louveciennes (FR)

( * ) Notice: Subject to any disclaimer, the term of this patent is extended or adjusted under 35 U.S.C. 154(b) by 0 days.

(21) Appl. No.: 09/280,682

(22) Filed: Mar. 29, 1999

(30) Foreign Application Priority Data

Apr. 15, 1998 (FR) .................................................. 98 04692

(51) Int. Cl.$^7$ .................................................. G06F 12/08
(52) U.S. Cl. ............................................................ 711/204
(58) Field of Search .................................. 711/202, 203, 711/206–209, 219, 204

(56) References Cited

U.S. PATENT DOCUMENTS

| | | | |
|---|---|---|---|
| 4,279,014 | 7/1981 | Cassonnet | 364/200 |
| 4,951,194 | 8/1990 | Bradley et al. | 364/200 |
| 5,220,669 | * 6/1993 | Baum et al. | 395/775 |
| 5,274,811 | 12/1993 | Borg et al. | 395/700 |

FOREIGN PATENT DOCUMENTS 0566421   10/1993   (EP) .

* cited by examiner

*Primary Examiner*—Kevin Verbrugge
(74) *Attorney, Agent, or Firm*—Miles & Stockbridge P.C.; Edward J. Kondracki

(57) ABSTRACT

The invention relates to a process for accessing a storage area of a digital data processing machine (19) in a physical addressing mode the storage arena also being accessible in a virtual addressing mode by means of virtual addresses, each constituted by a logical page number (LPN) and a relative address (SPRA). A first logical page number (i) in question corresponds to a first given physical page number (q), and a second logical page number (i+1) contiguous to the first logical page number (i) in question corresponds to a second physical page number (s), not necessarily contiguous to the first given physical page number (q). The process is comprised of writing, at the address constituted by the first logical page number (i) in question and by a relative address having a first predetermined value, the second physical page number (s).

6 Claims, 4 Drawing Sheets

METHOD AND SYSTEM FOR ACCESSING STORAGE AREA OF A DIGITAL DATA PROCESSING MACHINE IN BOTH THE PHYSICAL AND VIRTUAL ADDRESSING MODES

BACKGROUND OF THE INVENTION

1. Field of the Invention

The present invention relates to a process for accessing a storage area in the physical addressing mode, the storage area of a digital data processing machine also being accessible in a virtual addressing mode. The present invention also relates to a digital data processing machine comprising a storage area that is accessible in both the physical addressing mode and the virtual addressing mode.

2. Description of Related Art

The virtual addressing mode makes it possible to allocate one or more segments of virtual memory in a virtual address space to a process currently being executed in the machine. A segment of virtual memory is traditionally constituted by pages of fixed size, each accessible by means of a logical page number. When a storage area of the machine is accessible by means of virtual addresses, each constituted by a logical page number and a relative address, during access a given physical page number corresponds to the logical page number in question. The relative address is what indicates the address within a logical page. The size of the physical page is identical to that of the virtual page. Real access to the storage area of the machine is gained by means of a known mechanism that translates the virtual address into a physical address constituted by the physical page number and the relative address. The advantage of a virtual address space is that it represents an addressing potentiality that is available for a process or a thread of this process without the need to be concerned with the actual existence of a physical page in memory or with the location of this page in physical memory if it exists. Since the correspondence between the logical page number and the physical page number is generated by an effective access of the process to the virtual address, two contiguous logical page numbers do not necessarily correspond to two contiguous physical page numbers in physical memory.

The physical addressing mode enables a process or a thread of this process to access the physical memory directly without using the known mechanism for translating a virtual address into a physical address as mentioned above. This addressing mode is particularly useful for certain functions of the operating system of the machine. For example, the above-mentioned mechanism can use the physical addressing mode.

A storage area necessary to the execution of a process can cover more than one physical page of the machine. The storage area can be used, for example, to contain executable instruction code or data like that contained in a stack, a buffer, or an array. To access the storage area, the process performs address calculations required by the reading of an instruction line that follows a current instruction, or of an instruction line defined by a jump in the case where the storage area contains executable instruction code; the process also performs address calculations required by the reading or writing of a datum that follows a previously processed datum, or of a datum located at a fixed distance from a previously processed datum.

In the virtual addressing mode, these calculations are performed on logical addresses. The storage area is accessed by means of logical page numbers forming a continuous sequence. Likewise, the calculation of a new address that follows a current address is performed simply by adding a whole number to the current address. The case in which the new address is constituted by a logical page number different from that of the current address does not pose any particular problem. It matters little that the physical pages accessed in the storage area constitute a fragmented set. The mechanism for managing the virtual address space takes care of creating an appropriate correspondence between the logical page number and the physical page number.

However, a problem arises when using the physical addressing mode to access the storage area if the physical page numbers that cover it do not constitute a continuous sequence. In effect, a simple addition to a current address runs the risk of generating a physical page number that is not allocated to the storage area. Moreover, the mechanism for managing the virtual address space generally allows the physical page numbers allocated to the storage area to change during the execution of different processes in the machine.

One usual solution is to reserve a storage area accessible in the physical addressing mode as soon as the machine starts up, by reserving a continuous sequence of physical page numbers that are locked, i.e., whose allocation cannot be modified by the virtual addressing mechanism while the machine is in operation.

The usual solution has many drawbacks. The reserved physical page numbers reduce the possibilities for the virtual memory managing mechanism to map physical page numbers to logical page numbers. Difficulties arise when defining in the virtual addressing mode a storage area accessible in the physical addressing mode, at any instant in the operation of the machine, since there is a high risk that the mechanism for managing the virtual address space will map the logical page numbers to physical page numbers that do not constitute a continuous sequence.

SUMMARY OF THE INVENTION

To mitigate the above-mentioned drawbacks, the invention proposes a process for accessing a storage area of a digital data processing machine in the physical addressing mode, said storage area also being accessible in the virtual addressing mode by means of virtual addresses, each constituted by a logical page number and a relative address, a first logical page number in question corresponding to a first given physical page number, and a second logical page number contiguous to the first logical page number in question corresponding to a second physical page number not necessarily contiguous to said given physical page number, characterized in that it is comprised of writing, at the address constituted by the first logical page number in question and by a relative address having a first predetermined value, said second physical page number.

Thus, it is possible to access the same storage area of a digital data processing machine in both the physical addressing mode and the virtual addressing mode.

According to a particular mode of implementation, the process is characterized in that each incrementation of an old current address, a new relative address is produced in response to each incrementation of the old current address and triggers a comparison of the new relative address to the first predetermined relative address value and generates a new current address such that:

the new current address is constituted by the first logical page number in question for the virtual addressing mode, by the corresponding physical page number for the physical addressing mode, and by the new relative address produced if the new relative address is less than the relative address having the first predetermined value, the new current address is constituted by a second logical page number contiguous to the logical page number in question for the virtual addressing mode, by the second physical page number for the physical addressing mode, and by a relative address having a second predetermined value if the new relative address is greater than or equal to the relative address having the first predetermined value.

DESCRIPTION OF THE PREFERRED EMBODFIMENTS

Figure 1:
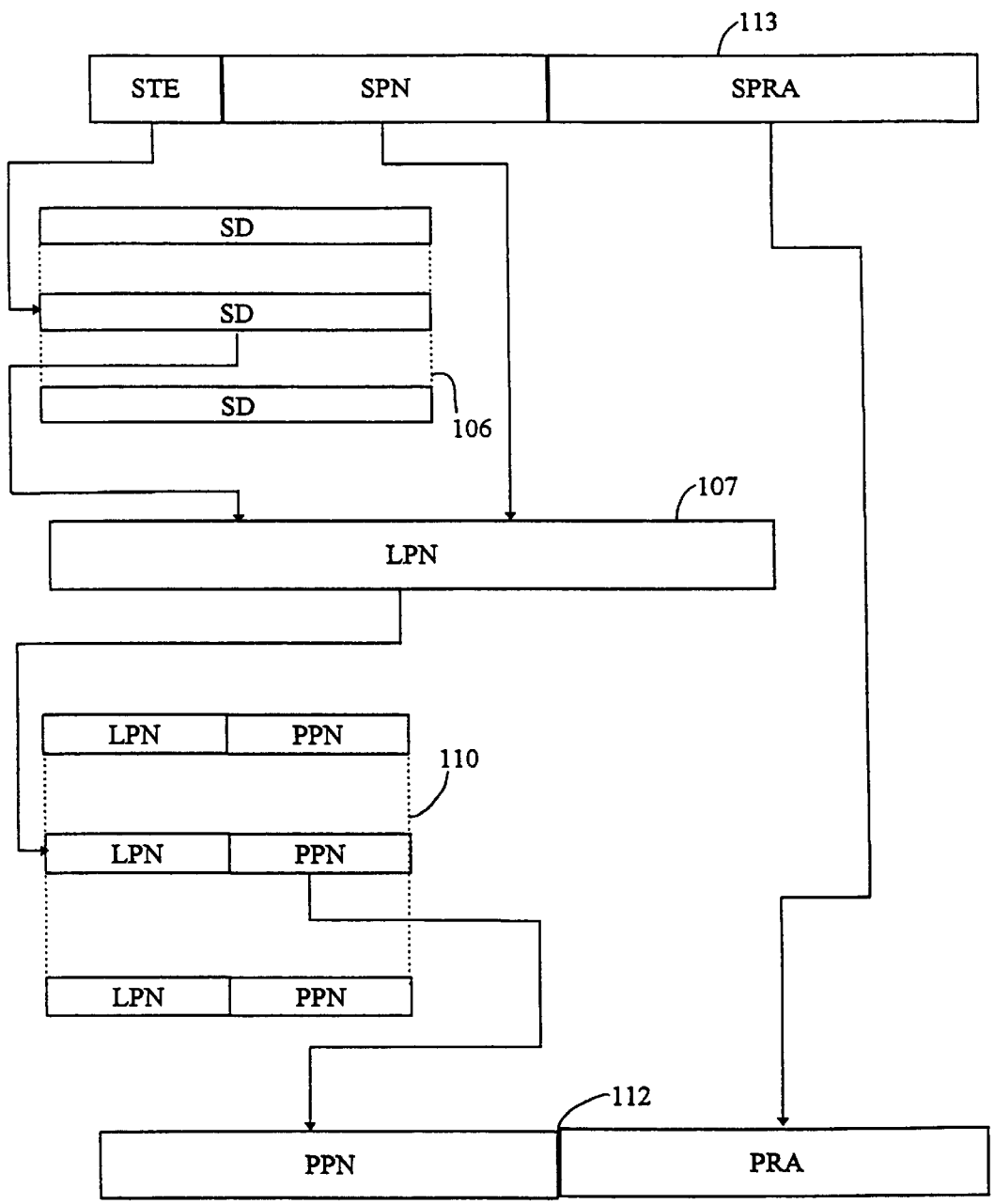
FIG. 1 briefly summarizes a segmented virtual addressing operation, the terms of which are useful to the explanation of the invention in reference to the figures that follow.

In reference to these drawings, the name effective address EA is given to a logical entity 113 essentially comprising three fields STE, SPN and SPRA. The field STE contains a number i of bits for encoding an entry of a segment table 106 constituted by $2^i$ registers. For example, the table 106 contains sixteen registers if the value of i is four. Each register is intended to contain a number m of bits for referencing a segment identifier SD. This makes it possible to segment an address space into $2^m$ segments of virtual memory. For example, the identifier SD makes it possible to distinguish sixteen mega-segments if the value of m is twenty-four. The prefix mega in this case should be taken in the computing sense of the term, i.e., as being equal to one thousand twenty-four kilos, the kilo itself being equal to one thousand twenty-four units. The field SPN contains a number j of bits for encoding a page number in a segment. A segment can therefore contain $2^j$ distinct pages of virtual memory, for example sixty-four kilopages if the value of j is sixteen. The field SPRA contains a number k of bits for encoding a relative address of a byte within a page, the byte being the smallest unit of computer data, generally eight or nine bits, addressable by the system. A page can therefore contain $2^k$ bytes, for example four kilobytes if the value of k is twelve.

A concatenation of a segment identifier SD and a page number SPN provides a logical page number LPN 107. It is therefore possible to reference $2^{m+j}$ distinct logical pages, for example a terapage if the value of m+j is forty. By addressing the bytes of each page using the field SPRA, it is thus possible to obtain a virtual address space of four petabytes, the prefixes tera and peta being understood in the computing sense of the terms.

A logical page table LPT 110 makes it possible to map a physical page number PPN to a given logical page number LPN. By concatenating the physical page number PPN with a relative address PRA in the page so referenced, a physical address 112 of a byte is obtained. The relative address PRA is a direct copy of the field SPRA. If for example the physical page number is encoded in twenty bits, it is possible to obtain a physical address encoded in thirty-two bits for accessing a physical memory of four megabytes.

Among the various possible operating mechanisms for the table 110 that may be cited is that of U.S. Pat. No. 4,279,014 by J -C. Cassonnet et. al., some of whose references to FIG. 1 have been intentionally reused in the present description in reference to this figure.

Virtual addressing makes it possible to obtain an address space that is considerably larger than the available physical address space. One skilled in the art will also be familiar with other advantages, such as the fact that it facilitates the editing of dynamic links to the execution of programs.

The considerable size of the virtual address space makes it so that at a given instant, a logical page number LPN is not necessarily referenced in the table LPT. It is possible, however, that there is an existing physical page number PPN in physical memory that can correspond to the logical page number LPN.

Figure 2:
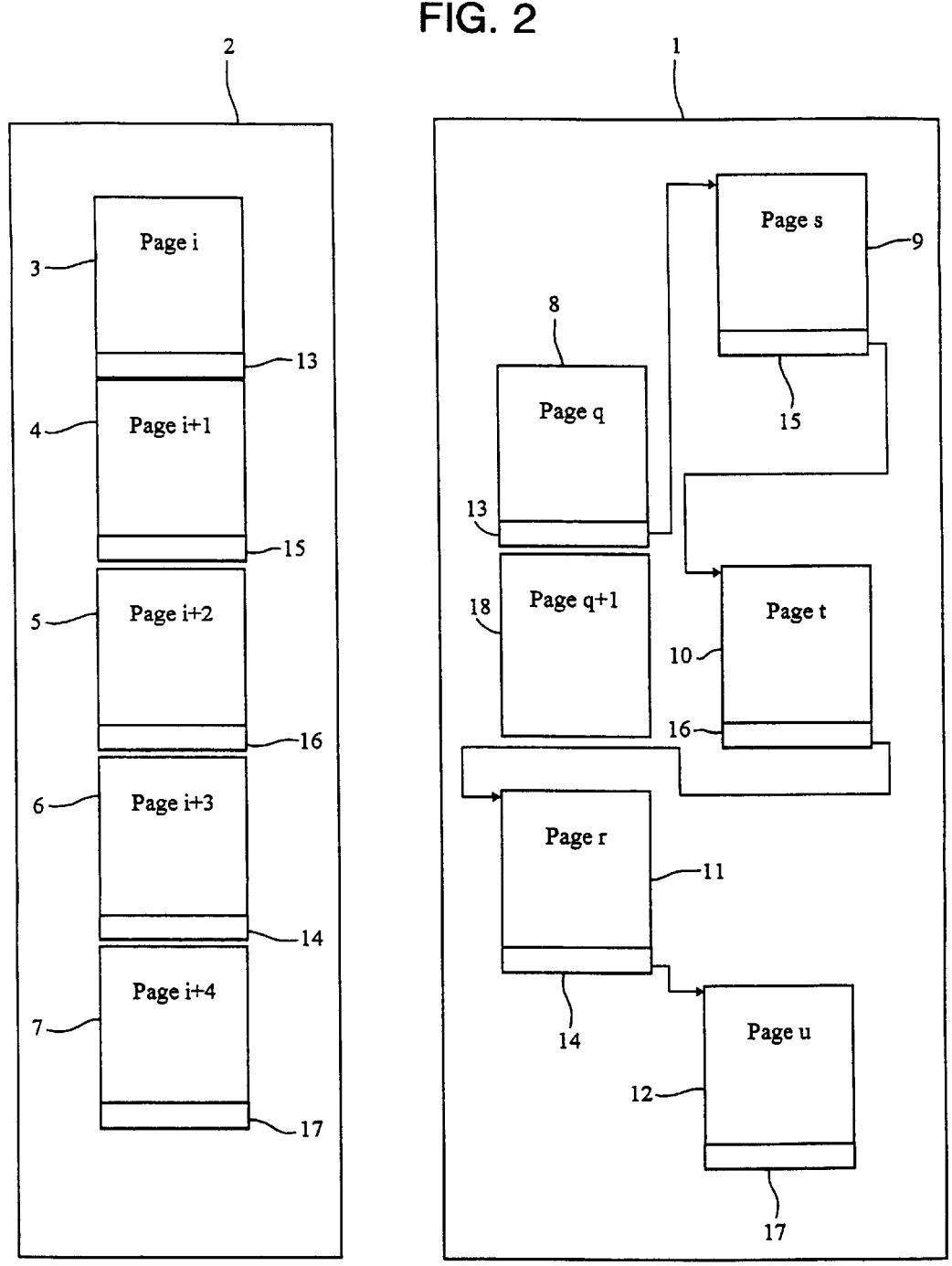
FIG. 2 shows a storage area implementing the invention.

In reference to FIG. 2, the physical memory 1 of a data processing machine is accessible in the virtual addressing mode by means of a logical space 2. A process defines in the logical space 2 a storage area constituted for example by pages 3 through 7 having contiguous logical page numbers i, i+1, i+2, i+3, i+4. The pages 3 through 7 are physically represented in physical memory 1 by pages 8 through 12, respectively. The respective physical page numbers q, s, t, r, u of the pages 8 through 12 are not necessarily contiguous, since the table 110 maps each logical page number to a physical page number as a function of the physical page numbers q, r, s, t, u that are available at the moment in which the correspondence is established.

The correspondences between the logical page numbers i, i+1, i+2, i+3, i+4 and the physical page numbers q, r, s, t, u are frozen in order to prevent the physical page numbers q, r, s, t, u from being able to correspond to other logical page numbers as long as the machine is executing processes using the storage area.

According to the example of FIG. 2, the physical representation of the page 3 of the virtual address space 2 is the page 8 in the memory 1 of the machine. The physical page number q corresponds to the logical page number i in the table 110. The physical representation of the page 4 of the virtual address space 2 is the page 9 in the memory 1 of the machine. The physical page number s corresponds to the logical page number i+1 in the table 110.

When a process executed by a processor in the virtual addressing mode goes from the page 3 to the page 4, it has only to increment the logical page number. On the other hand, a process executed by a processor in the physical addressing mode cannot go from the page 8 to the page 9 simply by incrementing the physical page number q because it would then be addressing a page 18 with the physical page number q+1, which does not necessarily correspond to the page 4.

A process according to the invention is comprised of writing the physical page number s at the address constituted by the logical page number i and by a relative address 13 of predetermined value. Using the correspondence mechanism, the physical page number is found at the relative address 13 of the page 8.

Thus, a process executed by a processor in the physical addressing mode can go from the page 8 to the page 9 by preliminarily reading, at the relative address 13 of the page 8, the physical page number s contained a that address. The relative address 13 being of predetermined value, the process will be programmed to have knowledge of this predetermined value.

The storage area represented in FIG. 2 being constituted by the pages 3 through 7 in the virtual address space 2, it is advantageous to write the physical page numbers t, r, u, respectively, at the address constituted by the logical page number i+1, i+2, i+3 and by a relative address 15, 16, 14 of predetermined value. Using the correspondence mechanism, the physical page numbers t, r, u, respectively, are therefore found at the relative address 15 of the page 9, at the relative address 16 of the page 10 and at the relative address 14 of the page 11. Depending on the use for which the storage area is intended, it is possible to write, at the address constituted by the logical page number i+4 and by a relative address 17 of predetermined value, an end-of-storage-area indicator for a purely sequential usage, the physical page number q for a cyclic or random access use of the storage area, or not to write anything there, if there is no page following the page 7 in the virtual addressing mode or following the page 12 in the physical addressing mode. Of course, access by a process to the storage area in the physical addressing mode is facilitated if all of the relative addresses 13 through 16 or 17 have the same predetermined value.

Certain processes use a storage area through successive incrementations of addresses in the storage area. This is the case, for example, for processes executing sequential code lines without any jumps. It is also the case, for example, for processes for filling or dumping a storage area allocated to a buffer, a stack or a table.

The process according to the invention offers an additional advantage for this particular type of process when each incrementation of an old current address with a logical page number i or a physical page number q produces a new relative address in response to each incrementation of the old current address and triggers a comparison of the new relative address to the first predetermined relative address value 13 and generates a new current address such that:

the new current address is constituted by the logical page number i in question for the virtual addressing mode, by the corresponding physical page number q for the physical addressing mode, and by the new relative address produced if the new relative address is less than the relative address 13 having a first predetermined value, the new current address is constituted by a logical page number i+1 contiguous to the logical page number i in question for the virtual addressing mode, by the other physical page number s for the physical addressing mode, and by a relative address having a second predetermined value if the new relative address is greater than or equal to the relative address 13 having the first predetermined value.

By using a null value for the second predetermined value, the new current addresses accesses the beginning of the next page as soon as it reaches the first predetermined value of the address 13.

By using the value of the last accessible address of the current page for the first predetermined value, one uses in one page, before going on to the next page, all of the bytes that constitute it minus those required for the storage of the next physical page number.

Figure 3:
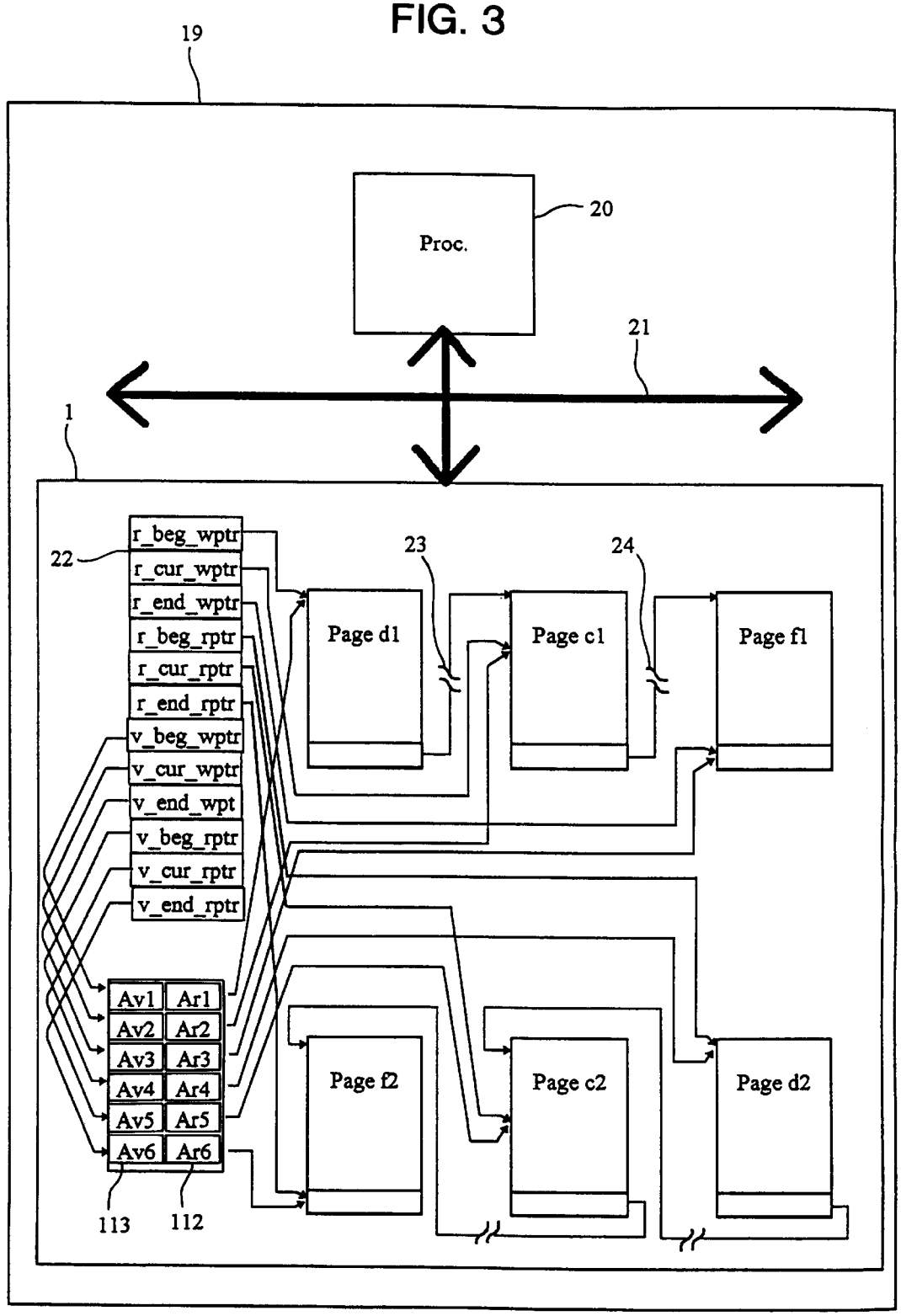
FIGS. 3 and 4 show a machine implementing the invention.

In reference to FIG. 3, a machine 19 comprises one or more processors 20 accessing the memory 1 of the machine by means of a system bus 21.

By way of a non-limiting example, a storage area is constituted, in the memory 1, by two series of pages, each producing a buffer into which the processor 20 can write or read the data one after another. The first buffer is constituted by pages having the physical page numbers d1 through f1, among which the physical page number c1 is that of the current page being read- or write-accessed by the processor 20. The number c1 can assume any value among those defined by a chaining similar to the one described in reference to FIG. 2, including the numbers d1 or f1, in which case the page c1 is merged with the page d1 or f1, respectively. A break 23 in the chaining from the end of the page with the number d1 to the beginning of the page with the number c1 represents the fact that any number of pages can be chained between these two pages, and includes the fact these pages could be merged. A break 24 in the chaining from the end of the page with the number c1 to the beginning of the page with the number f1 represents the fact that any number of pages can be chained between these two pages, and incudes the fact that these pages could be merged.

Likewise, the second buffer is constituted by pages having the physical page numbers d2 through f2, among which the physical page number c2 is that of the current page being read- or write-accessed by the processor 20.

A control block 22 is contained in a page specially assigned to the storage area, distinct from the other pages of this area described above. The control block 22 contains, among other things, twelve pointers.

The pointer r_beg_wptr contains a real start address Ar1, a pointer r_end_wptr contains a real end address Ar3 and a pointer r_cur_wptr contains a real current buffer address Ar2 for write-accessing this buffer in the physical addressing mode.

A pointer r_beg_rptr contains a real start address Ar4, a pointer r_end_rptr contains a real end address Ar6, and a pointer r_cur_rptr contains a real current buffer address Ar5 for read-accessing this buffer in the physical addressing mode.

A pointer v_beg_wptr contains an effective start address Av1, a pointer v_end_wptr contains an effective end address Av3 and a pointer v_cur_wptr contains an effective current buffer address Av2 for write-accessing this buffer in the virtual addressing mode.

A pointer v_beg_rptr contains an effective start address Av4, a pointer v_end_rptr contains an effective end address Ar6 and a pointer v_cur_rptr contains an effective current buffer address Av5 for read-accessing this buffer in the virtual addressing mode.

The virtual addressing mechanism as described in reference to FIG. 1 maps a real address 112 with a value Ar1 through Ar6 to each effective address 113 having a respective value Av1 through Av6. An implementation of the process according to the invention as described in reference to FIG. 4 makes it possible to have the real addresses Ar1, Ar2, Ar3, Ar4, Ar5, Ar6 be identical to the values contained in the pointers r_beg_wptr, r_cur_wptr, r_end_wptr, r_beg_rptr, r_cur_rptr, r_end_rptr, respectively.

Figure 4:
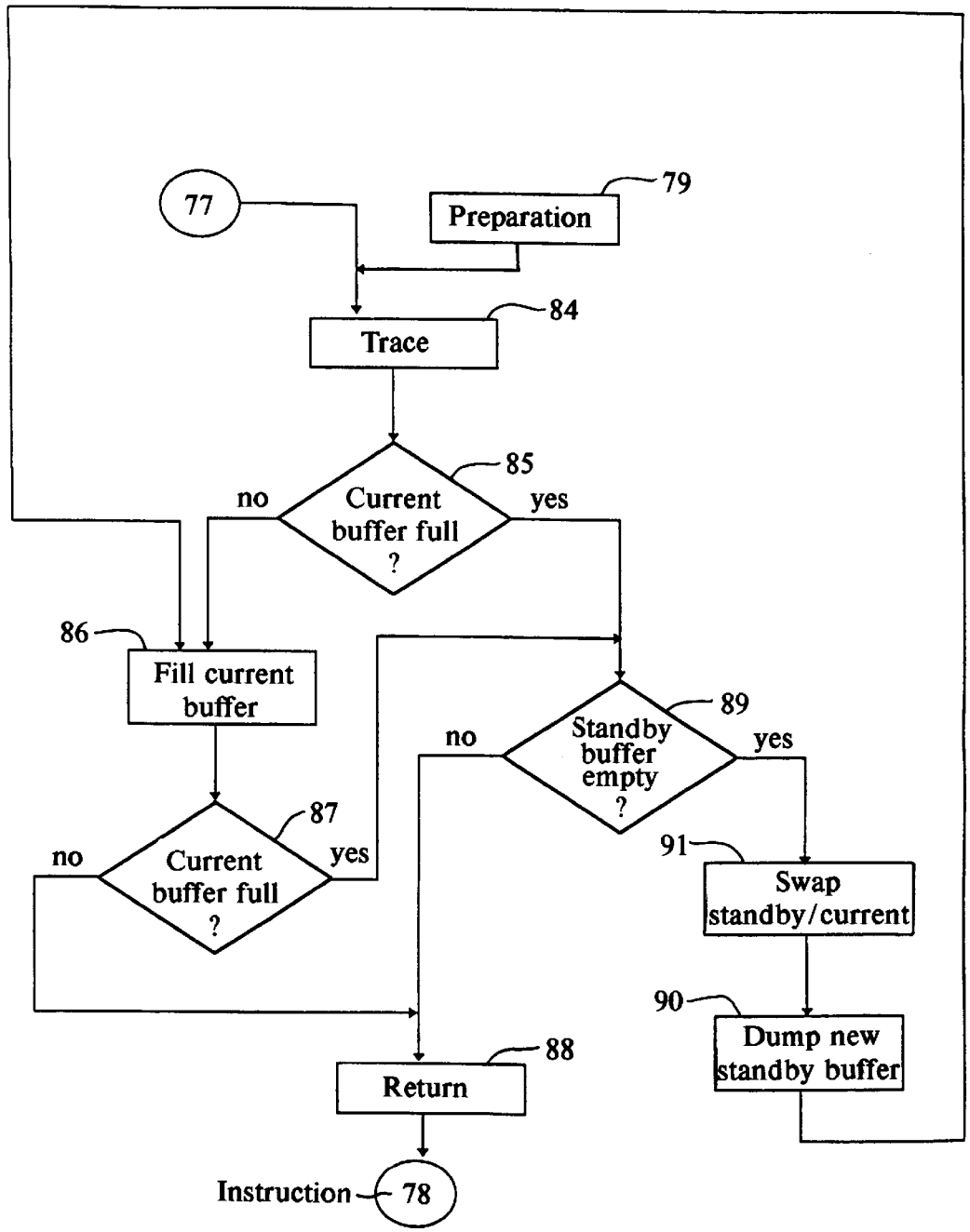

The implementation of the process in reference to FIG. 4 is particularly useful for alternate fills and dumps in two buffers by processes executed by processors in both the physical addressing mode and the virtual addressing mode. This implementation is useful, for example, for performing a trace 84 of an event occurring in the execution of a process by the machine. The trace 84 is activated with each instruction 77 generated by a process.

A preparation step 79 is used to define two buffers for temporarily containing the traced events before storing them in a mass memory of the machine. A storage area of 2n pages is reserved in the virtual addressing mode. The virtual addressing mode is recommended for reserving the 2n pages because the step 79 is carried out while the machine is in operation and the reserved pages are physically retrieved in the memory 1 by means of the virtual addressing mechanism from among the available pages, which may be dispersed in the memory 1. A number n of pages is reserved for a current buffer and a number n of pages is reserved for a standby buffer. The pages thus reserved are locked until they are released. The release of the pages occurs, for example, when no further event trace is desired.

The control block 22 is also created in the virtual addressing mode, in step 79. A current buffer start address Av1 is written into the pointer v_beg_wptr and into the pointer v_cur_wptr. A current buffer end address Av3 is written into the pointer v_end_wptr. The difference between the address values Av1 and Av3 is approximately equal to n times the content of one page. A standby buffer start address Av4 is written into the pointer v_beg_rptr and into the pointer v_cur_rptr. A standby buffer end address Av6 is written into the pointer v_end_rptr. The difference between the address values Av4 and Av6 is approximately equal to n times the content of one page. The physical addresses, also called real addresses Ar1, Ar3, Ar4, Ar6, which respectively correspond to the addresses of the virtual addressing mode Av1, Av3, Av4, Av6, are calculated from the mapping table 110, in reference to FIG. 1. The addresses Ar1, Ar3, Ar4, Ar6, respectively, are written into the pointers r_beg_wptr_and r_cur_wptr, r_end_wptr, r_beg_rptr and r_cur_rptr, r_end_rptr.

Thus, the current buffer is initialized by the pointers v_beg_wptr, v_cur_wptr, r_beg_wptr and r_cur_wptr, which point to the beginning of the page d1, the first two indirectly and the last two directly, and by the pointers v_end_wptr and r_end_wptr, which point to the end of the page f1, the first indirectly and the second directly. Likewise, the standby buffer is initialized by the pointers v_beg_rptr, v_cur_rptr, r_beg_rptr and r_cur_rptr, which point to the beginning of the page d2, the first two indirectly and the last two directly, and by the pointers v_end_rptr and r_end_rptr, which point to the end of the page f2, the first indirectly and the second directly.

Also in step 79 in the virtual addressing mode, a reading of the table 110 makes it possible to know each physical page number PPN corresponding to a logical page number LPN of the initialized current and standby buffers. The logical page number LPN of the first page of the current buffer is followed by a logical page number LPN+1 which, in the table 110, corresponds to a physical page number PPN(LPN+1). An address constituted by the number PPN(LPN+1) and by a null relative address is written at the end of the page having the logical page number LPN. The end of the page is defined by an address of predetermined value such as, for example, that of the last byte of the page minus the number of bytes per packet intended to be written into the current buffer. The preceding operation is repeated for each page number LPN+i until i=n−1, so that PPN(LPN+n−1)=f1. The same operations are carried out for the pages of the standby buffer.

Following step 84, a step 85 tests whether the current buffer is full. The test is performed in the physical addressing mode as it is in the virtual addressing mode, by reading the pointer v_cur_wptr and the pointer v_end_wptr. If the value of the pointer v_cur_wptr is strictly less than the value of the pointer v_end_wptr, the current buffer is not full and a step 86 is activated. If not, the current buffer is full and a step 89 is activated.

In step 86, the current buffer is filled by writing a data packet at the address contained in the pointer v_cur_wptr in the virtual addressing mode or at the address contained in the pointer r_cur_wptr in the physical addressing mode. A value corresponding to the size of the data written in terms of addresses is added to the content of the pointers v_cur_wptr and r_cur_wptr. If the relative address part of the content of the pointer v_cur_wptr or of the content of the pointer r_cur_wptr reaches or exceeds the relative address part of the address of predetermined value (end of the page), the relative address part of the contents of both pointers is replaced by a null value, the logical page number part of the content of the pointer v_cur_wptr is incremented by one unit and the physical page number part of the content of the pointer r_cur_wptr is replaced by the physical page number PPN contained at the address of predetermined value. Since at the end of step 79 the pointers v_cur_wptr and r_cur_wptr, in the virtual addressing mode and in the physical addressing mode respectively, pointed to the same byte at the beginning of page d1, with each activation of step 86, the pointers v_cur_wptr and r_cur_wptr, in the virtual addressing mode and in the physical addressing mode respectively, point to the same byte of a current page c1.

Following step 86, a step 87 tests whether the current buffer is full. The test is performed in the physical addressing mode as it is in the virtual addressing mode, by reading the pointer v_cur_wptr and the pointer v_end_wptr. If the value of the pointer v_cur_wptr is strictly less than the value of the pointer v_end_wptr, the current buffer is not full and a step 88 is activated. If not, the current buffer is full and the step 89 is activated.

Step 88 returns to the next instruction 78 of the current process being executed.

Step 89 tests whether the standby buffer is empty. The test is performed in the physical addressing mode as it is in the virtual addressing mode, by reading the pointer v_cur_rptr and the pointer v_beg_rptr. If the value of the pointer v_cur_rptr is equal to the value of the pointer v_beg_rptr, the standby buffer is empty and a step 91 is activated. If not, the standby buffer is empty and the step 91 is activated.

Step 91 performs a swap between the standby buffer and the current buffer by replacing the contents of the pointers r_cur_wptr and v_cur_wptr, respectively, with the contents of the pointers r_beg_wptr and v_beg_wptr, then the contents of the pointers r_beg_wptr, r_cur_wptr and r_end_wptr, respectively, with the contents of the pointers r_beg_rptr, r_cur_rptr, and r_end_rptr and vice versa, and by replacing the contents of the pointers v_beg_wptr, v_cur_wptr and v_end_wptr, respectively, with the contents of the pointers v_beg_rptr, v_cur_rptr and v_end_rptr and vice versa.

After each move to step 91, what was the standby buffer in step 89 becomes the new current buffer and what was the current buffer becomes the new standby buffer. After several moves to step 91, the status of the machine 19 is, for example, the one shown in FIG. 3, in which the new standby buffer is constituted by pages d2, . . . , c2, . . . , f2. Step 91 is followed by a step 90.

In step 90, a dump of the standby buffer is activated asynchronously, i.e., once activated, the dump is carried out in parallel, independently of the progress of the steps in FIG. 4. The dump always takes place in the virtual addressing mode: it is carried out by reading a data packet at the address contained in the pointer v_cur_rptr, initially equal to the content of the pointer v_beg_rptr, then writing this data packet into a mass memory. This is repeated after the subsequent actions, until the content of the pointer v_cur_rptr is equal to the content of the pointer v_end_rptr. A value corresponding to he size of the data read in terms of addresses, is added to the content of the pointer v_cur_rptr. If the relative address part of the content of the pointer v_cur_rptr reaches or exceeds the relative address part of the address of predetermined value (end of the page), the relative address part of the content of the pointer is replaced by a null value, and the logical page number part of the content of the pointer v_cur_rptr is incremented by one unit. At the end of step 90, the pointers v_cur_rptr and r_cur_rptr, respectively, are updated with the contents of the pointers v_beg_rptr and r_beg_rptr. Thus, in the virtual addressing mode and in the physical addressing mode respectively, they point to the same byte at the beginning of page d2.

Following the activation of the dump in step 90, step 86 is activated in order to write the data packet obtained by step 84 into the new current buffer.

While this invention has been described in conjunction with specific embodiments thereof, it is evident that many alternatives, modifications and variations will be apparent to those skilled in the art. Accordingly, the preferred embodiments of the invention as set forth herein, are intended to be illustrative, not limiting. Various changes may be made without departing from the spirit and scope of the invention as set forth herein and defined in the claims.

What is claimed is:

1. Process for accessing a storage area of a digital data processing machine (19) in a physical addressing mode, the storage area also being accessible in a virtual addressing mode by means of virtual addresses, each virtual address constituted by a logical page number (LPN) and a relative address (SPRA), wherein a first logical page number (i) in question corresponds to a first given physical page number (q), and a second logical page number (i+1) contiguous to the first logical page number (i) in question corresponds to a second physical page number (s), said second physical page number (s) not necessarily being contiguous to said first given physical page number (q), characterized in that the process comprises writing, at the address constituted by the logical page number (i) in question and by a relative address having a first predetermined value, said second physical page number (s).

2. The process for accessing a storage area of a digital data processing machine (19) in the physical addressing mode according to claim 1, further comprising upon incrementing an old current address producing a new relative address in response to each incrementation of the old current address and triggering in response to each incrementation a comparison of the new relative address to a first predetermined relative address value and generating a new current address such that:

the new current address is constituted by the first logical page number (i) in question for the virtual addressing mode, by the corresponding physical page number (q) for the physical addressing mode, and by the new relative address produced if the new relative address is less than the relative address having the first predetermined value, and the new current address is constituted by the second logical page number (i+1) contiguous to the first logical page number (i) in question for the virtual addressing mode, by said second physical page number (s) for the physical addressing mode, and by a relative address having a second predetermined value if the new relative address is greater than or equal to the relative address having the first predetermined value.

3. The process for accessing a storage area of a digital data processing machine (19) in the physical addressing mode according to claim 2, further comprising storing, in a control block (22) of said storage area, a first effective address (Av1) plus a corresponding first physical address (Ar1) of the beginning of the storage area, a second effective address (Av2) plus a corresponding second physical address (Ar2) that are current in the storage area, and a third effective address (Av3) plus a corresponding third physical address (Ar3) of the end of the storage area.

4. The process for accessing a storage area of a digital data processing machine (19) in the physical addressing mode according to claim 1, further comprising storing, in a control block (22) of said storage area, a first effective address (Av1) plus a corresponding first physical address (Ar1) of the beginning of the storage area, a second effective address (Av2) plus a corresponding second physical address (Ar2) that are current in the storage area, and a third effective address (Av3) plus a corresponding third physical address (Ar3) of the end of the storage area.

5. Digital data processing machine (19) comprising a storage area accessible by means of virtual addresses, each virtual address constituted by a logical page number (LPN) and a relative address (SPRA), a first logical page number (i) in question corresponding to a given physical page number (q), and a second logical page number (i+1) contiguous to the first logical page number (i) in question corresponding to a third physical page number (s) not necessarily contiguous to said given physical page number (q), said storage area containing, at the address constituted by the first logical page number (i) and by a relative address having a first predetermined value, said third physical page number (s).

6. Digital data processing machine according to claim 5, wherein said storage area further comprises a control block (22) containing a first effective address (Av1) and a first physical address (Ar1) of the beginning of a storage area, a second effective address (Av2) and a second physical address (Ar2) that are current in the storage area, and a third effective address (Av3) and a third physical address (Ar3) of the end of the storage area.

* * * * *